United States Patent [19]
Van Nort
[11] Patent Number: 4,842,122
[45] Date of Patent: Jun. 27, 1989

[54] TRANSPORTATION APPARATUS HAVING ADJUSTABLE SKIRTS

[75] Inventor: Alan D. Van Nort, Randolph, N.J.

[73] Assignee: Westinghouse Electric Corp., Pittsburgh, Pa.

[21] Appl. No.: 179,932

[22] Filed: Apr. 11, 1988

[51] Int. Cl.⁴ .............................................. B65G 17/00
[52] U.S. Cl. .................................................... 198/335
[58] Field of Search ................ 198/321, 323, 335, 337

[56] References Cited

U.S. PATENT DOCUMENTS 3,989,133 11/1976 Courson et al. .
3,991,877 11/1976 Kraft et al. .
4,159,758 7/1979 Courson .
4,646,907 3/1987 Steibig et al. ....................... 198/335

FOREIGN PATENT DOCUMENTS 2941773 4/1981 Fed. Rep. of Germany ...... 198/335
467211 2/1969 Switzerland ........................ 198/323
672135 6/1979 U.S.S.R. ............................. 198/335

*Primary Examiner*—Joseph E. Valenza
*Attorney, Agent, or Firm*—D. R. Lackey

[57] ABSTRACT

Transportation apparatus including a support structure, a conveyor on the support structure having a plurality of platforms for transporting passengers between spaced landings, and skirt panels having inner sides adjacent to the support structure and outer sides adjacent to the platforms. A running clearance gap between the skirt panels and the platforms is adjustable from the outer sides of the skirt panels via openings in the skirt panels which are in registry with adjustment devices actuatable to change the positions of the skirt panels relative to the support structure.

6 Claims, 3 Drawing Sheets

FIG. 3

TRANSPORTATION APPARATUS HAVING ADJUSTABLE SKIRTS

BACKGROUND OF THE INVENTION

1. Field of the Invention:

The invention relates in general to transportation apparatus having a plurality of platforms, pallets, or steps which convey passengers between spaced landings.

2. Description of the Prior Art:

Transportation apparatus for moving passengers from one landing to another, such as escalators and moving walks, include a conveyor or endless belt mounted on a supporting structure. A plurality of platforms, steps or pallets, hereinafter called steps, are fastened to the endless belt, and skirt panels are mounted on each side of the conveyor, immediately adjacent to the moving steps. The skirt panels are commonly formed of a plurality of skirt sections disposed in end-to-end relation to provide a continuous skirt structure. Skirt mounting brackets are adjustably attached to the supporting structure, and the skirt sections are unadjustably fixed to the skirt mounting brackets.

When the transportation apparatus is initially constructed at the job site, the skirt brackets are adjusted relative to the support structure to provide a predetermined running clearance between the skirt panels and the adjacent sides of the steps. An inner deck structure is then fastened between upstanding balustrades disposed on each side of the conveyor and the skirt panels. The balustrades support moving handrails which move in synchronism with the moving steps.

It is important to initially set the running clearance to within the applicable code required maximum dimension, such as three-sixteenths of an inch, and to maintain this maximum clearance during usage of the apparatus.

SUMMARY OF THE INVENTION

Briefly, the present invention facilitates both the initial adjustment of running clearance, and periodic readjustment thereof, by making the running clearance adjustable through the skirt panels. Instead of adjustably attaching the skirt brackets to the supporting structure or truss, and unadjustably fixing the skirt panels to the skirt brackets, the present invention unadjustably fixes the skirt brackets to the supporting structure and adjustably fixes the skirt panels to the skirt brackets. The adjustment means includes a screw, with the skirt panels having openings aligned with the adjustment screws. Thus, once the skirt brackets are fixed to the supporting structure, the escalator may be completely assembled, including the inner deck structure, as the inner deck structure no longer prevents access to the running clearance adjustment means. While initial adjustment is facilitated by the present invention, significant savings are realized when running clearance adjustment is required after initial installation. Depending upon where the adjustment openings are placed in the skirt panels, i.e., above or below the tread level of the steps, the most that need be done to adjust running clearance is to remove one step to gain access to the running clearance adjustments. If the adjustment openings are above the tread level, then step removal is not required.

BRIEF DESCRIPTION OF THE DRAWINGS

The invention may be better understood and further advantages and uses thereof more readily apparent when considered in view of the following detailed description of exemplary embodiments, taken with the accompanying drawings, in which.

DESCRIPTION OF PREFERRED EMBODIMENTS

Figure 1:
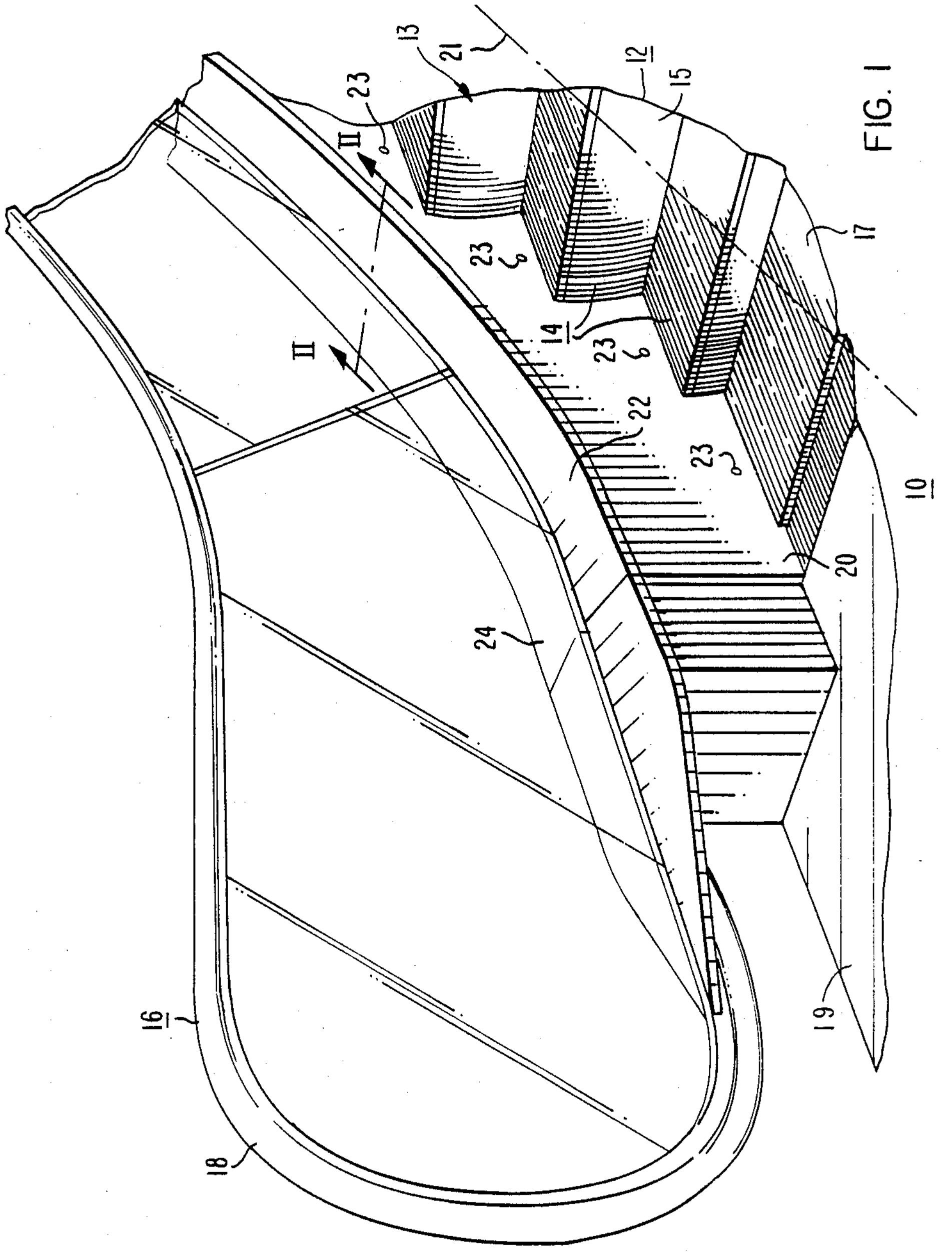
FIG. 1 is a fragmentary, perspective view of transportation apparatus which is constructed according to a first embodiment of the invention.

Referring now to the drawings, and to FIG. 1 in particular, there is shown a fragmentary, perspective view of transportation apparatus 10 constructed according to a first embodiment of the invention. Transportation appratus 10, for purposes of example is in the form of an escalator, but the invention is equally applicable to moving walks. In order to simplify the drawings, only those details of transportation apparatus 10 which are necessary to understand the teachings of the invention will be described. If additional information relative to the construction of apparatus 10 is desired, U.S. Pat. Nos. 3,989,133; 3,991,877 and 4,159,758 may be referred to, which patents are assigned to the same assignee as the present application.

Transportation apparatus 10 includes a conveyor or endless belt 12 having a plurality of steps 14. Steps 14 include an upstanding riser portion 15, and a tread portion 17, with tread portion 17 having an upper surface which is disposed in a horizontal plane. Conveyor 12 includes an upper or load bearing run 13 during which passengers stand on the step treads 17 as they are transported between spaced landings, such as landing 19, and a lower return run of the steps. A balustrade 16 is disposed on one side of conveyor 12 for guiding a continuous, flexible handrail 18 about a closed handrail guide loop. A balustrade similar to balustrade 16 is disposed on the remaining side of conveyor 12, and it is not shown as transportation apparatus 10 is symmetrical about a longitudinal axis 21 which extends between the spavced landings.

A skirt panel 20 is disposed immediately adjacent one side of the moving steps 14, with an inner deck 22 providing a smooth transition between an inner surface of the balustrade 16 and skirt 20. An outer deck 24 provides a smooth transition from an outer surface of balustrade 16 to the outer extremity of one lateral side of transportation apparatus 10. Similar skirt and deck assemblies are associated with the balustrade located on the other side of the moving steps 14.

According to a first embodiment of the invention, a plurality of small spaced openings 23 are provided through the skirt panel 20, and like openings are disposed through the skirt panel located on the other side of longitudinal axis 21. Because of the symmetry of transportation apparatus 10 the following description will apply equally to both sides of apparatus 10, without further reference being made to the unshown side. Openings 23 provide access to dimensional adjustments, and in the embodiment of FIG. 1 the openings are disposed through skirt panel 20 at locations which are above the horizontal planes defined by the tread portions 17 of steps 14.

Figure 2:
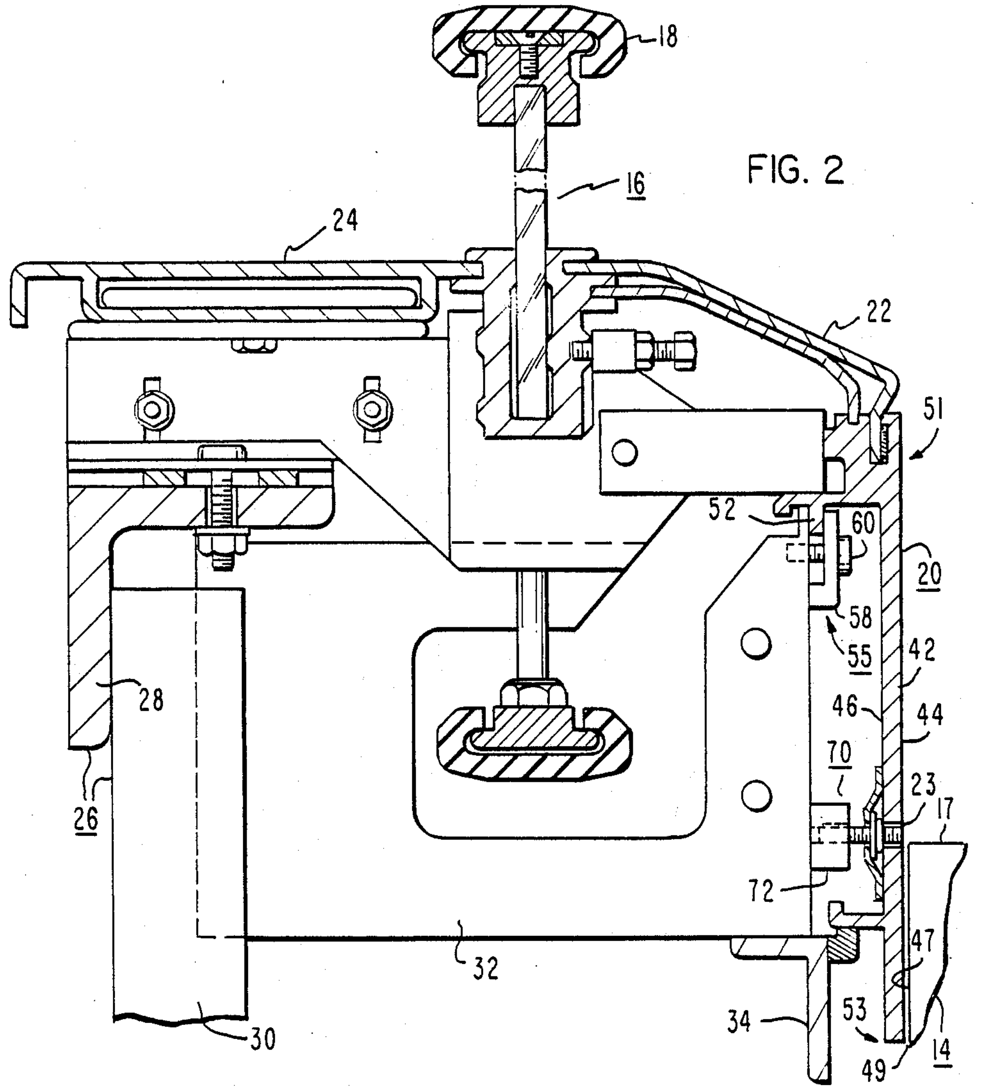
FIG. 2 is a cross-sectional view of the transportation apparatus shown in FIG. 1, taken between and in the direction of arrows II—II.

FIG. 2 is a cross-sectional view of transportation apparatus 10 shown in FIG. 1, taken in direction of arrows II-II. Transportation apparatus 10 includes a supporting structure or truss 26, which supports conveyor 12 and balustrade 16. Supporting structure 26 includes a truss chord 28 and a plurality of truss upright members, such as truss upright member 30, which members are welded between truss chords. A plurality of skirt mounting brackets, such as skirt mounting bracket 32, are welded to the truss uprights 30, and to a structural member 34 which provides a dimensional reference for skirt 20 adjacent to the steps 14. The plurality of skirt brackets 32 extend in spaced relation between the landings, and they need have no provision for adjustment relative to the support structure 26.

Skirt panel 20 includes a wall portion 42 having a first or outer side or surface 44 which faces the steps 14, and a second or inner side or surface 46 which faces the skirt brackets 32 and associated supporting structure 26. The first or outer side 44 of skirt panel 20 is spaced from the adjacent sides of the steps 14, such as side 47, to provide a running clearance gap 49 between the moving steps 14 and stationary skirt panel 20. Skirt panel 20 has an upper portion 51 which is adjacent to inner deck 22, and a lower portion 53 adjacent to the steps 14.

In a preferred embodiment of the invention, skirt mounting bracket 32 includes a clamp assembly 55 having a movable portion 58 which, when actuated by a screw 60, clamps a depending portion 52 of skirt panel 20 against a fixed portion of bracket 32. This securely fastens the upper portion 51 of skirt panel 20 to the mounting brackets 32, and thus to the supporting structure 26.

Figure 3:
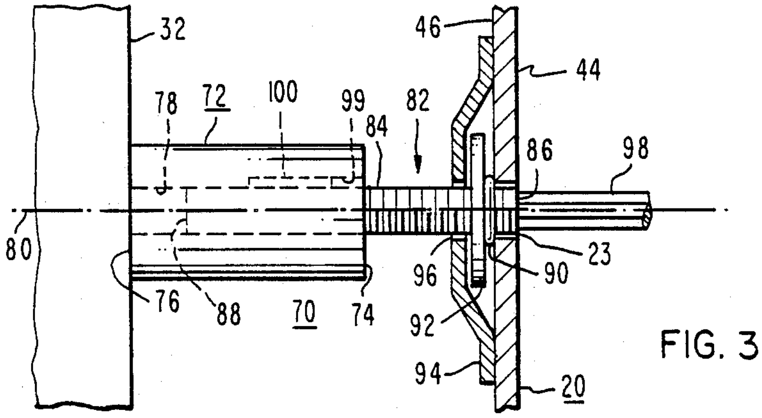
FIG. 3 is an enlarged view of a running clearance adjustment device shown in FIG. 2.

Notwithstanding the fixed upper portion 51 of skirt panel 20, the lower portion 53 of skirt panel 20, which is located adjacent to side 47 of step 14, is adjustable over a fraction of an inch, as necessary to properly set the dimension of the running clearance gap 49. This dimensional adjustment is provided by a plurality of adjustment devices 70 which are located at the spaced skirt brackets 32. FIG. 3 is an enlarged view of adjustment device 70.

More specifically, adjustment device 70 includes a metallic, cylindrical portion 72 having first and second axial ends 74 and 76, and a tapped opening 78 which extends inwardly from the first end 74. Opening 78 may extend to the second axial end 76 if desired. End 76 is fixed, such as by welding, to skirt bracket 32. Tapped opening 78 has a longitudinal axis 80 which is perpendicular to sides 44 and 46 of skirt panel 20, and one of the adjustment openings 23 in skirt panel 20 is located in registry with tapped opening 78.

Adjustment device 70 includes a movable portion 82 which is captured by skirt panel 20, and which is mechanically linked to cylindrical member 72. Movable portion 82 includes a threaded stud or screw 84 having first and second axial ends 86 and 88, respectively. A circumferentially enlarged or staked portion 90 is provided on screw 84 a predetermined dimension from the first axial end 86. A washer member 92 is disposed about screw 84, against enlarged portion 90, and a cup-like mounting bracket 94 having a central opening 96 for slidably receiving screw 84 is fixed to the inner side 46 of skirt panel 20. End 86 of screw 84 has an axially extending opening therein configured to receive a suitable actuating tool, such as Allen wrench 98.

End 86 of screw 84 may be substantially flush with outer side 44 of skirt panel 20, as illustrated, or it may be recessed, i.e., end 86 may be substantially flush with the inner side 46, as desired. If recessed, a small plastic button (not shown) may be inserted into opening 23, to conceal the adjustment device 70.

End 88 of screw 84 is threadably engaged with tapped opening 78. Screw 84 is captured by skirt panel 20 between the enlarged portion 90, which is too large to enter skirt panel opening 23, and washer 92, which is too large to enter opening 96 in the mounting bracket 94. Thus, actuating screw 84 in a clock-wise direction will move the bottom portion 53 of skirt panel 20 towards the stationary cylindrical member 72, increasing the dimension of the running clearance gap 49. Actuating screw 84 in a counter-clockwise direction will move the bottom portion 53 of skirt panel 20 towards side 47 of step 14, to reduce the dimension of the running clearance gap 49.

In the first embodiment of the invention shown in FIGS. 1 and 2, running clearance gap 49 may be adjusted simply by stopping conveyor 12, placing shims in the step-to-skirt gap 49, and actuating the plurality of adjustment devices 70 located along both sides of apparatus 10 to achieve the desired continuously uniform gap 49 on each side of the complete longitudinal dimension of apparatus 10.

Figure 4:
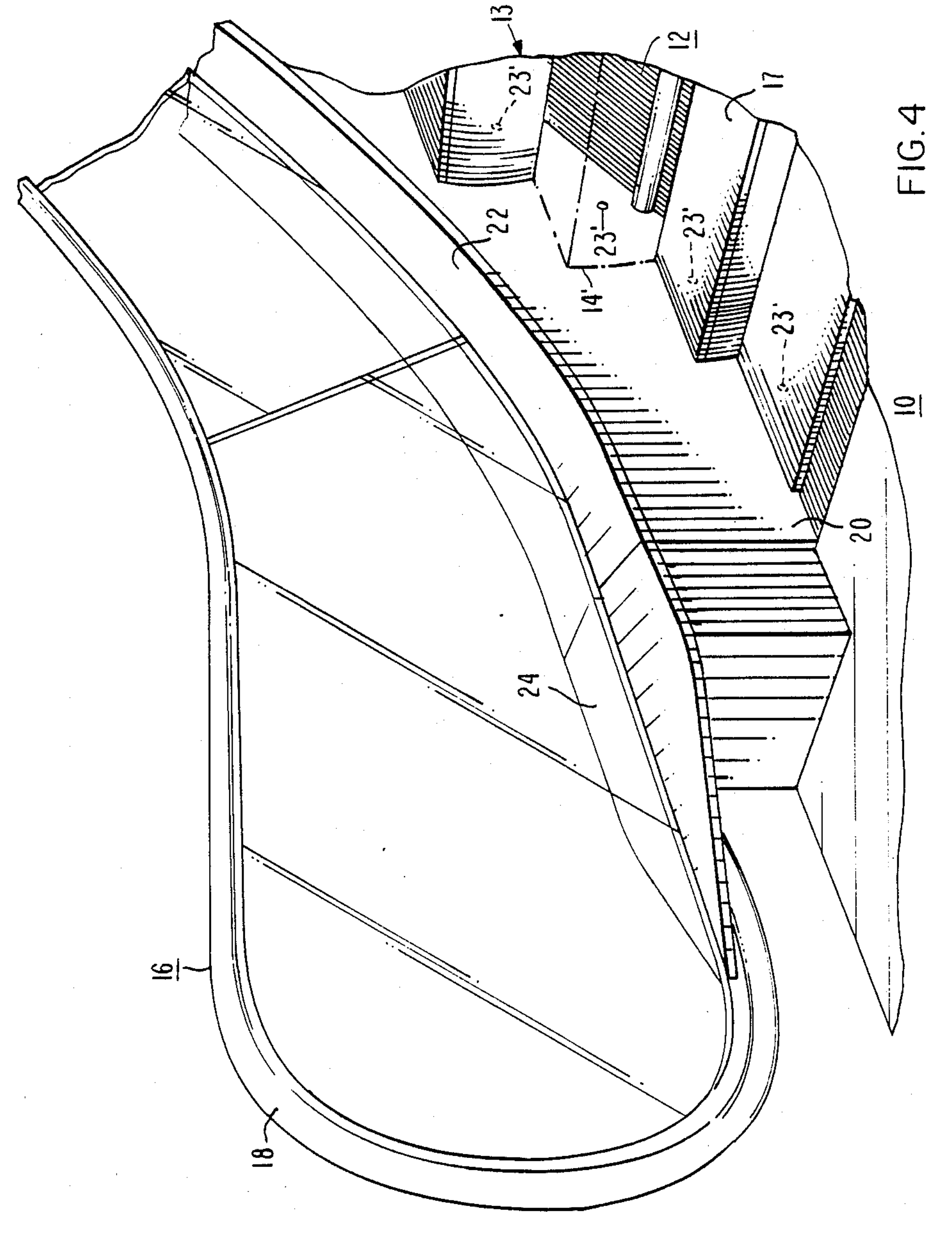
FIG. 4 is a view similar to FIG. 1, except illustrating another embodiment of the invention.

FIG. 4 is a view of transportation apparatus 10 which is similar to the view shown in FIG. 1, except the access openings, referenced 23 in the FIG. 2 embodiment, are located below the horizontal planes defined by step treads 17 in the FIG. 4 embodiment. The access or adjustment openings, referred to as openings 23' in the FIG. 4 embodiment are thus not visible to passengers on apparatus 10. Access to adjustment openings 23' may be readily gained by authorized maintenance personnel by simply removing one platform or step, as shown by the phantom step 14' in FIG. 4, and inching the conveyor 12 so the location of the removed step is successively adjacent to each of the access openings 23' and associated adjustment devices 70. Each adjustment device 70 is adjusted after shims are placed in the running clearance gap 49 associated with the steps 14 located above and below the location of the removed step 14'.

In order to prevent mechanical vibration from causing the adjustment devices 70 to change a selected position of screw 84 in tapped opening 78, the number of threads per inch may be selected to minimize movement of the screw unless actuated by a tool. Also, as shown in FIG. 3, a small axially extending slot or groove 99 may be formed in member 72 adjacent to the tapped opening 78 and a plastic member 100 placed in groove 99 such that the threads of screw 84 will engage the plastic member 100 and resist turning of the screw 84 except when actuated by wrench 98.

While in the preferred embodiment of the invention the upper portion 51 of skirt panel 20 is fixedly clamped, it is to be understood that the whole skirt panel 20 may be made adjustable by replacing clamp assemblies 55 with adjustment devices 70.

I claim as my invention:

1. Transportation apparatus for transporting passengers between spaced landings, comprising:

a supporting structure, first and second spaced balustrades on said support structure, a conveyor having a plurality of platforms which define first and second sides of the conveyor, said conveyor being mounted on said supporting structure with said first and second sides respectively adjacent to said first and second spaced balustrades, skirt panels disposed between said support structure and the first and second sides of said conveyor, said skirt panels each having an inner side facing said support structure, an outer side facing said plurality of platforms, and an upper edge, first and second inner decks extending from the upper edges of said skirt panels to said first and second balustrades, respectively, and adjustment means adjustably spacing said skirt panels from said support structure, for adjusting a running clearance gap between the outer sides of said skirt panels and said plurality of platforms, said adjustment means including a screw having first and second ends and a longitudinal axis extending between said ends, with said first end being an adjustment end, said screw being disposed with the longitudinal axis perpendicular to the inner side of at least one of said skirt panels, and with said adjustment end closely adjacent to said inner side, said at least one skirt panel defining an opening aligned with the adjustment end of said screw such that said screw is actuatable through the opening in said at least one skirt panel, from the platform side thereof to adjust the running clearance without removing skirt panels or an inner deck.

2. The transportation apparatus of claim 1 wherein the platforms have tread portions defining horizontal planes upon which passengers stand, and the opening defined by the at least one skirt panel is disposed above the horizontal planes defined by said tread portions, and accessible from the tread portions of the platforms without the necessity of removing platforms from the conveyor.

3. Transportation apparatus for transporting passengers between spaced landings, comprising:

a supporting structure, a conveyor having a plurality of platforms, said platforms having tread portions defining horizontal planes upon which passengers stand, said conveyor being mounted on said supporting structure, skirt panels disposed between said support structure and said plurality of platforms, said skirt panels each having an inner side facing said support structure and an outer side facing said plurality of platforms, and adjustment means adjustably spacing said skirt panels from said support structure, for adjusting a running clearance gap between the outer sides of said skirt panels and said plurality of platform, said skirt panels defining openings aligned with said adjustment means such that said adjustment means is actuatable through said skirt panels, from the platform sides thereof, said openings defined by the skirt panels being below the horizontal planes defined by said tread portions, requiring removal of a platform for access.

4. The transportation apparatus of claim 1 wherein the conveyor is an escalator and the platforms are steps.

5. The transportation apparatus of claim 1 wherein the adjustment means includes means defining a tapped opening fixed to the support structure, with the adjustment end of said screw being captured by the at least one skirt panel, said screw being engaged with the tapped opening, and means for preventing vibration from changing a selected position of said screw in said tapped opening.

6. The transportation apparatus of claim 1 wherein the support structure includes a truss and a plurality of spaced skirt brackets fixed to said truss, with the adjustment means interconnecting the skirt panels and skirt brackets.

* * * * *